United States Patent
Trojer et al.

(10) Patent No.: US 10,165,623 B2
(45) Date of Patent: Dec. 25, 2018

(54) SPLITTER DEVICE CONNECTING MULTIPLE REMOTE RADIO HEADS

(71) Applicant: TELEFONAKTIEBOLAGET LM ERICSSON (PUBL), Stockholm (SE)

(72) Inventors: Elmar Trojer, Täby (SE); Miguel Berg, Upplands Väsby (SE); Per-Erik Eriksson, Stockholm (SE); Chenguang Lu, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/507,304

(22) PCT Filed: Sep. 1, 2014

(86) PCT No.: PCT/SE2014/051001
§ 371 (c)(1),
(2) Date: Feb. 28, 2017

(87) PCT Pub. No.: WO2016/036283
PCT Pub. Date: Mar. 10, 2016

(65) Prior Publication Data
US 2017/0311379 A1    Oct. 26, 2017

(51) Int. Cl.
*H04W 88/08*    (2009.01)
*H04W 8/00*    (2009.01)

(52) U.S. Cl.
CPC ........... *H04W 88/085* (2013.01); *H04W 8/00* (2013.01)

(58) Field of Classification Search
CPC ....... H04W 88/08; H04W 8/00; H04W 24/08; H04W 74/00; H04W 88/085; H04L 27/34; H04L 27/362

USPC .......................................................... 455/507
See application file for complete search history.

(56) References Cited

U.S. PATENT DOCUMENTS

2003/0040329 A1    2/2003    Yona et al.

FOREIGN PATENT DOCUMENTS

| EP | 1085773 A1 | 3/2001 |
| EP | 1924109 A1 | 5/2008 |
| WO | 2013087748 A1 | 6/2013 |

OTHER PUBLICATIONS

International Search Report and Written Opinion dated Apr. 29, 2015 issued in Application No. PCT/SE2014/051001, 11 pages.

*Primary Examiner* — Shaima Q Aminzay
(74) *Attorney, Agent, or Firm* — Rothwell, Figg, Ernst & Manbeck, p.c.

(57) ABSTRACT

It is provided a splitter device comprising: a first trunk cable interface for connecting with a first aggregation node via a first trunk cable; a first radio head interface for connecting to a first remote radio head via a first distribution cable; a second radio head interface for connecting to a second remote radio head via a second distribution cable; a signal combiner and splitter connected to the first radio head interface and the second radio head interface; and a radio signal refresh unit provided between the first trunk cable interface and the signal combiner and splitter. The radio head interfaces comprise respective gain control units and uplink signal amplifiers, wherein a gain of the uplink signal amplifiers is adjusted based on a signal from the respective gain control unit.

17 Claims, 4 Drawing Sheets

SPLITTER DEVICE CONNECTING MULTIPLE REMOTE RADIO HEADS

CROSS REFERENCE TO RELATED APPLICATION

This application is a 35 U.S.C. § 371 National Stage of International Application No. PCT/SE2014/051001, filed Sep. 1, 2014, designating the United States, the disclosure of which is incorporated by reference.

TECHNICAL FIELD

The invention relates to a splitter device for use between an aggregation node and remote radio heads.

BACKGROUND

When deploying wireless communication networks, there is a balance between coverage and capacity. On the one hand, a few large cells can provide great coverage but at a cost of reduced capacity. On the other hand, a scenario with many small cells creates better capacity and throughput, but may not provide the desired coverage. Hence, there is often a combination of larger cells to provide sufficient coverage with smaller cells to provide better capacity.

However, providing coverage indoors using many small cells can be quite costly, with a radio base station for each such small cell. Moreover, when the cells get too small, wireless terminals moving in the network cause a great number of handovers which causes significant signalling overhead.

One solution to this problem is to use remote radio heads, where several remote radio heads connected to the same radio base station share the same cell. In this way, a single radio base station can provide coverage e.g. in different parts of a building, by placing the remote radio heads appropriately. Moreover, the wireless device can move between the coverage of different remote radio heads while staying within the same cell, thus avoiding causing handovers.

This reduces the need for network planning and coverage measurements which is cumbersome and costly. Instead, when a coverage hole is discovered, this can be addressed by simply by adding remote radio heads rather than costly network optimisation procedures.

When adding remote radio heads, either during initial deployment or later, it would be useful to provide a splitter device to allow multiple remote radio heads to fan out from a single trunk cable. However, no such splitters are known and how to balance complexity and cost versus functionality in such a splitter device is not trivial.

SUMMARY

It is an object to provide a splitter device for use between an aggregation node and remote radio heads.

According to a first aspect, it is provided a splitter device comprising: a first trunk cable interface for connecting with a first aggregation node via a first trunk cable; a first radio head interface for connecting to a first remote radio head via a first distribution cable, the first radio head interface comprising a first gain control unit and a first uplink signal amplifier, wherein a gain of the first uplink signal amplifier is adjusted based on a signal from the gain control unit; a second radio head interface for connecting to a second remote radio head via a second distribution cable, the second radio head interface comprising a second gain control unit and a second uplink signal amplifier, wherein a gain of the second uplink signal amplifier is adjusted based on a signal from the second gain control unit; a signal combiner and splitter connected to the first radio head interface and the second radio head interface; and a radio signal refresh unit provided between the first trunk cable interface and the signal combiner and splitter. Since each radio head interface has a separate gain control, uplink signals from the respective remote radio heads can be equalised, e.g. to compensate for cable loss, etc. Moreover, the splitter device effectively extends the range between the aggregation node and the remote radio heads.

The splitter device may further comprise an automatic gain control unit configured to receive automatic gain control signals from the first remote radio head and the second remote radio head, and to control the gain of the first uplink signal amplifier and the second uplink signal amplifier based on the first and second automatic gain control signals, respectively. Using the automatic gain control, a more dynamic compensation of differences between uplink signal levels of the respective remote radio heads is achieved. This provides a better quality of the combined uplink signal.

Each one of the first gain control unit and the second gain control unit may comprise a respective cable loss measurement unit. This allows an accurate compensation of different cable losses.

The radio signal refresh unit may comprise at least one of a downlink signal amplifier and an uplink signal amplifier.

The radio signal refresh unit may comprise a demodulator, a regenerator and a modulator which are all specific to a radio access technology. In this way, the radio signal is regenerated with great quality, allowing the remote radio head to be deployed with a longer cable to the splitter device, providing a great range extension.

The splitter device may further include delay compensation unit as part of the signal refresh unit that compensates for the cable delay introduced by the range extension.

The splitter device may further comprise a synchronisation refresh unit configured to improve a downlink synchronisation signal for provision over the first distribution cable and the second distribution cable.

The synchronisation refresh unit may comprise at least one of a synchronisation signal amplifier, a band-pass filter and a phase locked loop.

The splitter device may further comprise an operation and maintenance relay for relaying operation and maintenance messages between a central operation and maintenance node and each one of the first remote radio head and the second remote radio head.

The splitter device may further comprise an uplink power interface, a power unit and a downlink power interface, wherein the uplink power interface is configured to receive power from the first trunk cable for provision to the power unit and the radio head interface, the power unit is configured to power the splitter device and the downlink power interface is configured to provide power to remote radio heads via the respective distribution cables.

The power unit may comprise a direct current, DC to DC converter.

The splitter device may further comprise: a second trunk cable interface for connecting with a second aggregation node via a second trunk cable; and a controller configured to activate the second trunk cable interface when communication via the first trunk cable interface fails. This improves reliability of the splitter device and any connected remote radio heads.

The splitter device may be configured to be used both for downlink splitting and uplink combining.

The signal combiner and splitter may be configured to digitally multiplex uplink control signals from the first remote radio head and the second remote radio head.

The signal combiner and splitter may be configured to split downlink signals from the radio refresh unit for provision to the first radio head interface and the second radio head interface, and configured to combine uplink signals from the first radio head interface and the second radio head interface for provision to the radio refresh unit.

The radio signal refresh unit may be configured to improve a quality of uplink and/or downlink signals.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
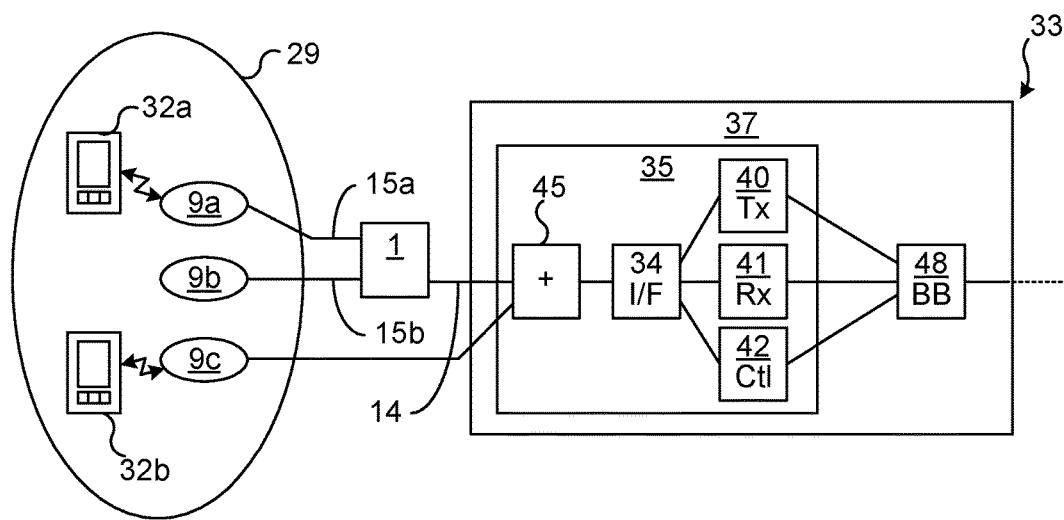
FIG. 1 is a schematic architecture diagram illustrating an environment where embodiments presented herein can be applied.

FIG. 1 is a schematic architecture diagram illustrating an environment where embodiments presented herein can be applied. The wireless communication network 33 comprises a number of remote radio heads 9a-c (three in this example) for installation in locations where traditional deployment with antennas being co-located with the radio base stations is not ideal. For example, the wireless communication network 33 can be installed indoors, such as in an office, shopping centre, train station, stadium, or airport.

It is to be noted that, while the embodiments presented herein are described as implemented using LTE (Long Term Evolution), any applicable communication standard may be used, such as any one or a combination of LTE-SAE (Long Term Evolution-System Architecture Evolution), W-CDMA (Wideband Code Division Multiplex), GSM (Global System for Mobile communication), EDGE (Enhanced Data Rates for GSM Evolution), GPRS (General Packet Radio Service), CDMA2000 (Code Division Multiple Access 2000), any of the IEEE 802.11 standards or any other current or future wireless network, such as LTE-Advanced, as long as the principles described hereinafter are applicable. In LTE, both Time Division Duplex (TDD) and Frequency Division Duplex (FDD) operation is supported.

A radio base station 37 here comprises a baseband module 48 and an indoor radio unit (IRU) 35. It is to be noted, however, that despite the terminology, the IRU can be deployed anywhere suitable, indoors or outdoors. The IRU 35 is in turn connected to, and is a link for, a number (in this example three) remote radio heads 9a-c. In this way, the radio base station 37 is a link for uplink and downlink communication for the remote radio heads 9a-c connected to the IRU 35. In this example, the first remote radio head 9a and the second remote radio head 9b are connected via a splitter device 1. In this way, a single trunk cable 14 can be used between the IRU 35 and the splitter device 1, and two distribution cables 15a-b to the first and second remote radio heads 9a-b, respectively. This allows multiple remote radio heads to be deployed using only a single trunk cable 14 between the IRU 35 and the splitter 1, which can improve coverage with reduced cabling requirements and/or the need for additional IRUs.

For example, the splitter device 1 is useful in a situation when only the first and the third remote radio heads 9a, 9c are deployed, and coverage needs to be improved, but there are no more ports on the IRU or cables to the IRU available. In this case, if the second remote radio head 9b can be installed not too far away from the first remote radio head 9a, the splitter device 1 allows both the first and the second remote radio heads 9a-b to connect with the IRU using a single trunk cable 14.

It can also be envisioned that the splitter device 1 and the first radio head 9a are integrated in the same physical box whereas radio head 9b is connected via a distribution cable 15b (not shown). In such architecture, the radio heads can be deployed in a daisy-chained fashion.

In the embodiment, shown, the remote radio heads 9a-c connected to the IRU 35 are part of a single cell 29 and thus share a cell identifier. Antennas do not need to be included in the radio base station 37 (or the IRU 35), as the remote radio heads 9a-c provide the antennas for the wireless link to one or more wireless devices 32a-b. The wireless link provided by the remote radio heads 9a-c includes both downlink (DL) communication to the wireless devices 32a-b and uplink (UL) communication from the wireless devices 32a-b. The term wireless device is also known as mobile communication terminal, user equipment (UE), station (STA), mobile terminal, user terminal, user agent, machine-to-machine devices etc., and can be, for example, what today is commonly known as a mobile phone or a tablet/laptop with wireless connectivity or fixed mounted terminal.

It is to be noted that while the remote radio heads 9a-c in FIG. 1 are all part of the same cell 29, different ports on the IRU could be configured to support different cells (not shown). Nevertheless, any remote radio heads being connected to a splitter device are part of the same cell.

In radio communication systems, the data is transmitted and received over the air at a specific radio frequency—either the same for transmission and reception or on separate frequencies. This is often called the radio frequency (RF) or the carrier frequency.

There are many different carrier frequencies, depending on regional spectrum allocation and spectrum license rights. To create a common radio implementation supporting this variety of carrier frequencies, a second set of frequencies is used herein, denoted the Intermediate Frequency (IF), which is used for communication on the cables between the IRU 35 and the remote radio heads 9a-c.

For uplink communication, the remote radio heads 9a-c downconvert a received (uplink) signal to IF and send it over its cable to the IRU 35. The received IF signals are combined in a combiner 45 and fed to an interface circuitry 34. The interface circuitry 34 extracts the received IF signal from the interface and forwards it to the RX (reception) back-end 41. In one embodiment, the RX backend 41 comprises an analogue to digital (A/D) converter which samples the signal on IF and converts to a digital signal. In another embodiment, the RX back-end 41 first downconverts the received signals from IF to an analogue BB (baseband) signal which is further filtered and converter to a digital signal in an analogue to digital converter. The RX back-end 41 sends the combined received signals in digital form to the baseband module 48 for further processing such as demodulation, decoding, etc. as known in the art per se. Optionally, instead of adding signals in combiner 45, individual radio signals from remote radio heads 9a-c can be sent to the RX backend 41 and individual baseband processing BB 48.

Optionally, the splitter device 1 and the remote radio heads 9a-c are also powered over the respective cables, e.g. using Power over Ethernet (PoE).

For downlink communication, the process works in reverse to the uplink. Hence, the baseband module 48 sends a digital BB signal for transmission to a TX (transmission) back-end 40 of the IRU 35. In one embodiment, the TX back-end 40 converts the digital BB signal to an analogue signal in IF directly in a digital to analogue (D/A) converter. In another embodiment, the TX back-end 40 converts the digital BB signal to an analogue transmission signal and upconverts the transmission signal to IF in the analogue domain. The transmission signal in IF is then inserted onto the interface by the interface circuitry 34, and provided to the combiner 45 which also functions as a splitter, providing the same transmission signal in IF to all connected remote radio heads 9a-c over the respective cables. Optionally, instead of using the combiner 45 as a splitter, individual radio signals generated in BB 48 can be sent to individual instances of interface circuitry 34 via per-port TX processors in the TX back-end 40. The remote radio heads 9a-c then upconvert the IF signal to RF and transmit the RF signal over the air to the wireless devices 32a-b.

It is to be noted that the processing of uplink and downlink signals in the IRU and the remote radio heads 9a-c do not need to occur in the digital domain and can be (but do not need to be) performed completely in the analogue domain.

The remote radio heads 9a-c convert from IF to RF for downlink transmission and from RF to IF for uplink reception. Conversely, the IRU converts from digital BB to IF for downlink transmission and from IF to digital BB for uplink reception.

By using IF over the cables instead of RF, cheaper, widely deployed electrical cables can be used, such as Ethernet LAN cabling. In this way, existing indoor cabling can many times be reused during installation, which significantly saves cost and installation time.

Moreover, there is a control link between a processor 42 in the IRU 35 and each remote radio head 9a-c. This control link can be used e.g. to set the RF frequency used for downconversion and upconversion in the remote radio heads 9a-c, radio carrier setup/teardown, or for fault monitoring.

The transmission and reception is under the control of the MAC (Media Access Control) scheduler in the baseband module 48. The MAC scheduler informs what transmissions should be made and informs, via the downlink signaling, the wireless devices when to transmit and on which frequency and power.

It is to be noted that, although FIG. 1 shows the baseband module 48 connected to one IRU 35, each baseband module 48 can be connected to several IRUs. Each IRU may have several cells, its own cell or several IRUs may share a single cell.

It is to be noted that while the embodiment of FIG. 1 shows three remote radio heads 9a-c, there may be fewer or more remote radio heads connected to each IRU 35. Moreover, the number of cells can vary.

Figure 2:
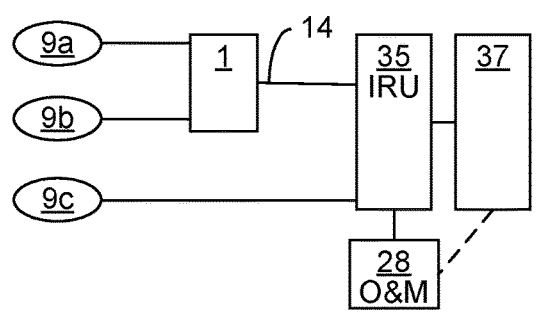
FIG. 2 is a schematic architecture diagram illustrating an environment comprising an embodiment of a splitter device and an operation and maintenance node.

FIG. 2 is a schematic architecture diagram illustrating an environment comprising an embodiment of a splitter device 1 and a central operation and maintenance (O&M) node 28. In this embodiment, the IRU 35 is separate from the radio base station 37.

The operation and maintenance node 28 allows an operator to monitor the various nodes and/or maintain the nodes, e.g. by configuration, etc. It is to be noted that the operation and maintenance node 28 could alternatively be connected to the radio base station 37 instead of (or in addition to) the IRU 35.

Figure 3:
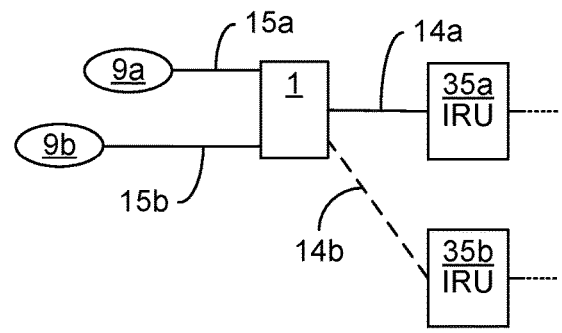
FIG. 3 is a schematic architecture diagram illustrating an environment comprising an embodiment of a splitter device taking advantage of multiple indoor radio units.

FIG. 3 is a schematic architecture diagram illustrating an environment comprising an embodiment of a splitter device taking advantage of multiple IRUs. Hence, a first trunk cable 14a connects the splitter device 1 with a first IRU 35a and a second trunk cable 14b connects the splitter device 1 with a second IRU 35b. In this way, connectivity for the splitter device can be provided using either one of the two trunk cables 14a-b, providing a redundant and thus more reliable system in case one of the trunk cables 14a-b or IRUs 35a-b fails.

Figure 4:
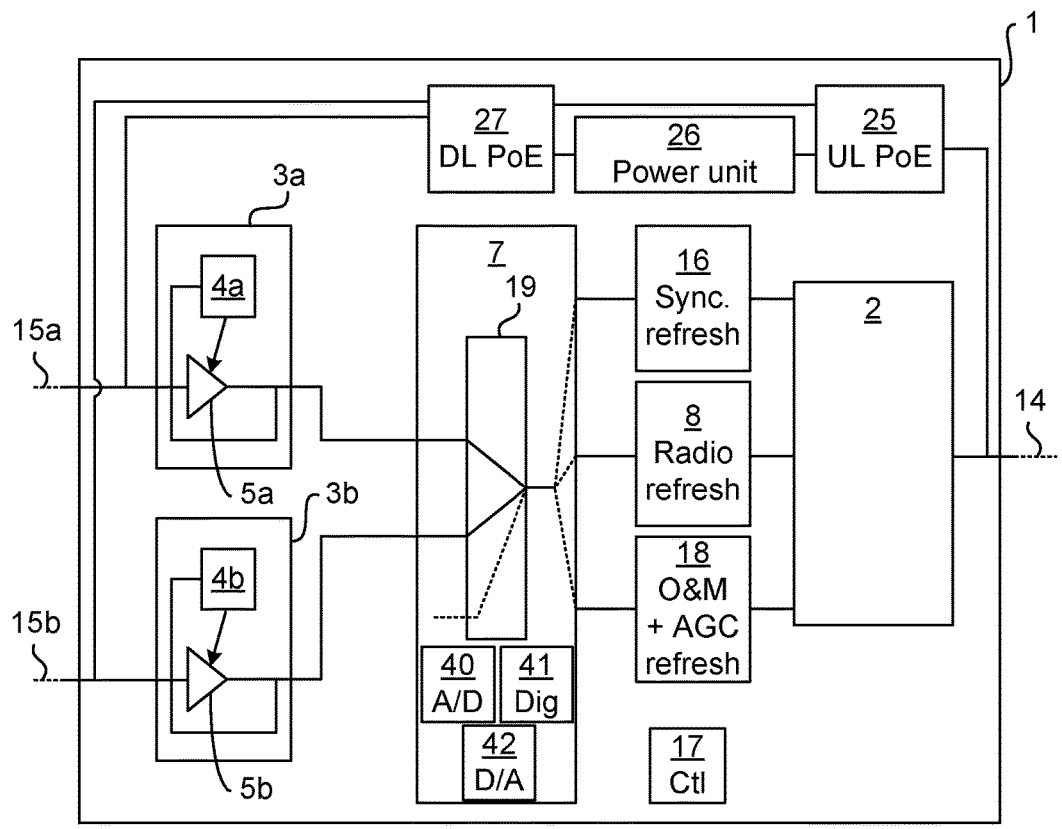
FIG. 4 is a schematic diagram illustrating an embodiment of the splitter device of FIGS. 1-2.

FIG. 4 is a schematic diagram illustrating an embodiment of the splitter device 1 of FIGS. 1-2.

A (first) trunk cable interface 2 is provided for connecting with an aggregation node (e.g. an IRU) via a (first) trunk cable 14, e.g. as shown in FIGS. 1-2. The aggregation node is a node which aggregates signals to and from several remote radio heads. Hence, one embodiment of an aggregation node is an IRU. The trunk cable interface 2 comprises cable-specific parts for reception and transmission, such as a physical cable connector (e.g. RJ45), line transformation devices, line amplifiers (line driver, line receiver), cable filter, and cable equalization device. The trunk cable interface 2 also separates and combines different data and control signals present on the cable in different frequency bands using a number of cable hybrids and diplexers.

A first radio head interface 3a is provided for connecting to a first remote radio head via a first distribution cable 15a and a second radio head interface 3b is provided for connecting to a second remote radio head via a second distribution cable 15b. This connection to the remote radio heads can be direct or pass through one or more other splitter devices. The first radio head interface 3a comprises a first gain control unit 4a and a first uplink signal amplifier 5a. A gain of the first uplink signal amplifier 5a is adjusted based on a signal from the gain control unit 4a. Analogously, the second radio head interface 3b comprises a second gain control unit 4b and a second uplink signal amplifier 5b, and a gain of the second uplink signal amplifier 5b is adjusted based on a signal from the second gain control unit 4b.

A signal combiner and splitter 7 is connected to the first radio head interface 3a and the second radio head interface 3b. This is where the actual splitting and combining of signals occurs. The signal combiner and splitter 7 combines uplink signals from the two radio head interface s 3a-b to a single uplink signal. Moreover, the signal combiner and splitter 7 splits downlink signals to the first radio head interface 3a and the second radio head interface 3b. In this way, the splitter device 1 is configured to be used both for downlink splitting and uplink combining.

The signal combiner and splitter 7 can e.g. be implemented using a resistive network that sums currents from different ports uplink and splits current to different ports downlink. Essentially, this comprises an op-amplifier and some resistors.

Optionally, the signal combiner and splitter 7 is configured to digitally multiplex uplink control signals from the first remote radio head 9a and the second remote radio head 9b as received over the first distribution cable 15a and the second distribution cable 15b, respectively. In such a case, the combiner and splitter 7 comprises an A/D converter 40, digital circuitry 41 to extract the uplink control signals and to multiplex these, and a D/A converter 42 to reinsert the control signals in the uplink signal.

A radio signal refresh unit 8 is provided between the first trunk cable interface 2 and the signal combiner and splitter 7. The radio refresh signal unit 8 improves the quality of the radio signal (uplink and/or downlink) in the analogue domain and/or the digital domain. Hence, the radio signal refresh unit 8 can comprise a downlink signal amplifier, an uplink signal amplifier or both.

The signal combiner and splitter 7 can be provided as shown in FIG. 4 between the radio refresh unit 8 and the radio head interface s 3a-b. Hence, the signal combiner and splitter 7 can be arranged to split downlink signals from the radio refresh unit 8 for provision to the first radio head interface 3a and the second radio head interface 3b. Moreover, the signal combiner and splitter 7 is arranged to combine the uplink signals from the first radio head interface 3a and the second radio head interface 3b for provision to the radio refresh unit 8. However, the signal combiner and splitter 7 could also be provided between the trunk cable interface 2 and the radio refresh unit 8, in which case the radio refresh unit 8 would need to be able to refresh signal on two separate paths.

An optional O&M and automatic gain control (AGC) unit 18 is configured to receive AGC signals from the first remote radio head and the second remote radio head. The gain of the first uplink signal amplifier 5a and the second uplink signal amplifier 5b are then controlled based on the first and second AGC signals, respectively.

Optionally, the O&M and AGC unit 18 provides an O&M relay for relaying operation and maintenance messages between the central operation and maintenance node (28 of FIG. 2) and each one of the first remote radio head 9a and the second remote radio head 9b.

An optional synchronisation refresh unit 16 is configured to improve a downlink synchronisation signal for provision over the first distribution cable 15a and the second distribution cable 15b. The downlink synchronisation signals are distributed to the distribution cables.

Optionally, power is supplied over the trunk cable 14 to be provided to the distribution cable 15a-b, e.g. using POE. In such a case, the splitter device 1 comprises an uplink power interface 25, a power unit 26 and a downlink power interface 27. By supplying power over the trunk cable 14, no separate power cabling is required, greatly simplifying deployment.

The uplink power interface 25 is configured to receive power from the trunk cable 14 for provision to the power unit 26 and the radio head interface 27. The power unit 26 is configured to power the splitter device 1 itself and the downlink power interface 27 is configured to provide power to remote radio heads 9a-b via the respective distribution cables 15a-b.

A controller 17 controls the general operation of the splitter device 1. For instance, the controller 17 provides local management functions like cable measurements (cable loss, noise, etc.) for the trunk cable and/or distribution cables, configuration management, as well as fault management, in cooperation or alternatively to the O&M and AGC refresh node 18.

In this way, the controller can provide information whether a remote radio head connection is possible and alert if distribution cables are too long and/or too many remote radio heads are connected (and thus use too much power). This prevents an operator installing remote radio heads connected to the splitter device 1 which will not function properly.

The controller 17 can e.g. be any combination of one or more of a suitable central processing unit (CPU), multiprocessor, microcontroller, digital signal processor (DSP), etc., capable of executing software instructions stored in a memory (not shown). Alternatively or additionally, the controller comprises hardware based logic, e.g. an application specific integrated circuit a field programmable gate array or discrete logical components arranged to perform the desired control operations.

It is to be noted that while the splitter device 1 of FIG. 4 is illustrated with two radio head interfaces 3a-b, the splitter device 1 can be provided with any suitable number of radio head interfaces. If only one radio head interface is provided (or utilised), the splitter device 1 functions as an extender between the aggregation node (IRU) and the node in the direction of UEs (the remote radio head), allowing a remote radio head to be deployed further away from an IRU than would otherwise be possible.

Figure 5:
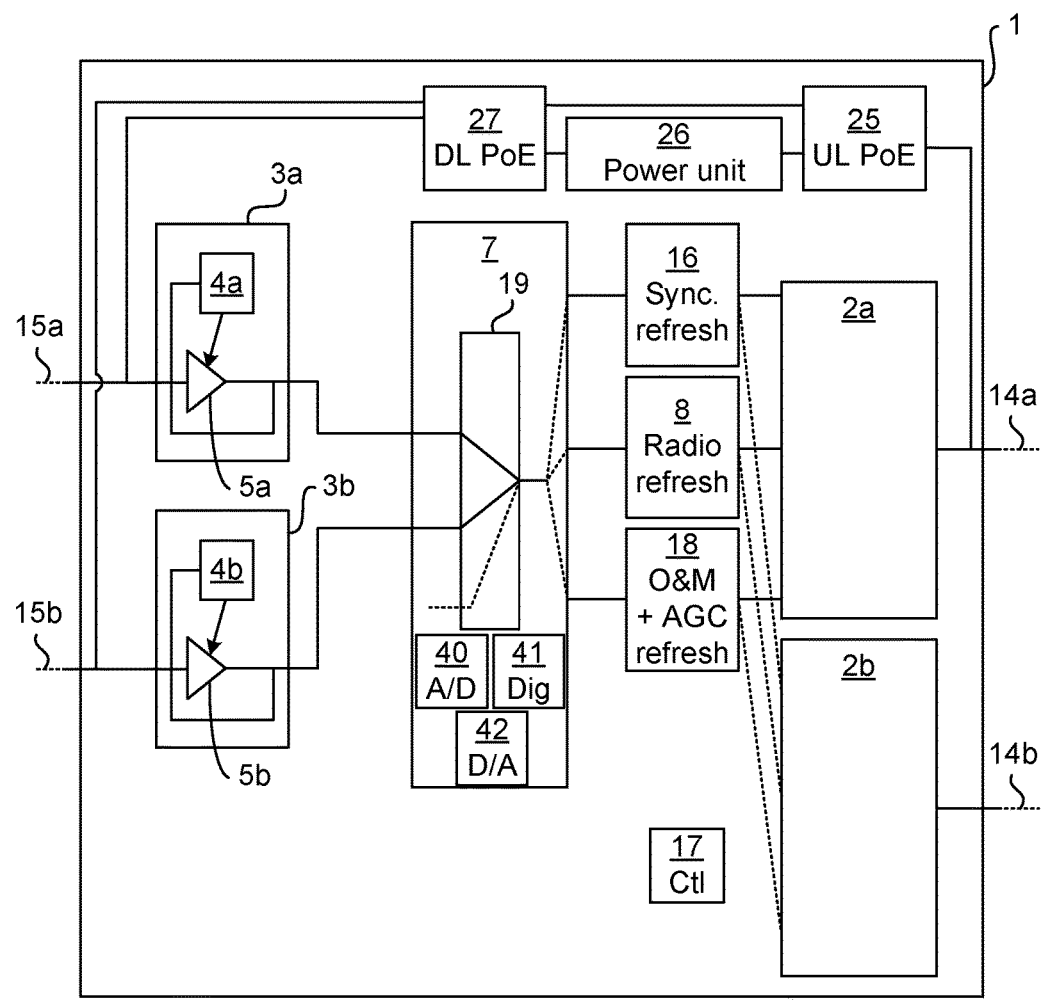
FIG. 5 is a schematic diagram illustrating an embodiment of the splitter device of FIG. 3 being capable of taking advantage of multiple indoor radio units.

FIG. 5 is a schematic diagram illustrating an embodiment of the splitter device of FIG. 3 being capable of taking advantage of multiple IRUs. The splitter device 1 is similar to the splitter device of FIG. 4 and corresponding elements will not be described again.

Here however, the splitter device 1 also comprises a second trunk cable interface 2b for connecting with a second aggregation node via a second trunk cable 14b, alongside the first trunk cable interface 2a for connecting with the first aggregation node via the first trunk cable 14a, e.g. as shown in FIG. 3.

In this embodiment, the controller 17 activates the second trunk interface 2b when communication via the first trunk cable interface 2a fails, or vice versa. This can e.g. be detected based on cable fault indicators such as PoE hardware handshaking, L1 indicators (loss of signal) or controlled maintenance messages. Also, the controller can send an alarm to the central O&M node 29.

In one embodiment, the first trunk cable interface 2a is always a main interface and the second trunk cable interface 2b is a backup interface. In one embodiment, the first trunk cable interface 2a and the second trunk cable interface 2b are equivalent and whichever trunk cable interface 2a, 2b is active is the current trunk cable interface and the other trunk cable interface is the backup trunk cable interface.

Figure 6:
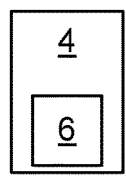
FIG. 6 is a schematic diagram illustrating an embodiment of the gain control unit of FIGS. 4-5.

FIG. 6 is a schematic diagram illustrating an embodiment of the gain control unit of FIGS. 4-5. Each one of the gain control units 4a-b of FIGS. 4-5 is here represented by a single gain control unit 4. The gain control unit 4 here comprises a cable loss measurement unit 6. In this way, during deployment, distribution cable loss can be measured, whereby the gain of the amplifier(s) corresponding radio head interface can be configured to compensate for the cable loss. The signal levels from uplink signals from different remote radio heads are equalised and are combined at equivalent signal levels. In this way, a remote radio head connected to the splitter device using a long cable with a large cable loss alongside a remote radio head connected to the splitter device using a short cable with low cable loss without signals from the near remote radio head completely drowning out the other.

Figure 7:
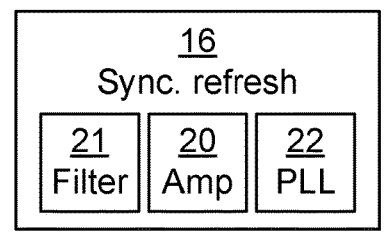
FIG. 7 is a schematic diagram illustrating an embodiment of the synchronisation refresh unit of FIGS. 4-5.

FIG. 7 is a schematic diagram illustrating an embodiment of the synchronisation refresh unit 16 of FIGS. 4-5. The synchronisation refresh unit 16 ensures that the synchronisation signal is of good quality. This can be achieved using any one or more of a signal amplifier 20, a band-pass filter 21 and a phase locked loop (PLL) 22. Consequently, the synchronisation refresh unit 16 receives the master FDD (Frequency Division Duplex) and/or TDD (Time Division Duplex) synchronisation signals from the trunk cable interface 2 and improves the synchronisation signal quality using amplification, narrow filtering, and/or PLL.

Figure 8:
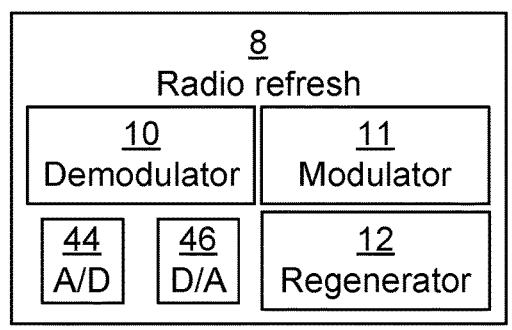
FIG. 8 is a schematic diagram illustrating an embodiment of the radio refresh unit of FIGS. 4-5.

FIG. 8 is a schematic diagram illustrating an embodiment of the radio refresh unit of FIGS. 4-5. The radio refresh unit in this embodiment is operable in the digital domain and comprises a demodulator 10, a regenerator 12 and a modulator 11. The regenerator may also include signal delay processing to compensate for additional cable delay. All of these components are specific to a radio access technology to allow proper demodulation, modulation and regeneration in the digital domain. For instance, the radio access technology can be LTE, W-CDMA, etc. The radio refresh unit 8 also comprises an A/D converter 44 and a D/A converter 46 as the signal on either side of the radio refresh unit 8 is analogue. Using the digital domain radio refresh, the radio signals are be re-amplified, re-shaped, and re-timed, whereby the distribution cables can be much longer compared to if only analogue amplification is used. This is due to the regenerated signals being of (essentially) the same quality as from the source.

Figure 9:
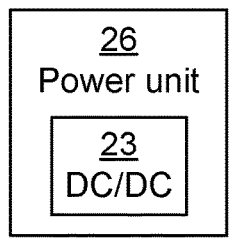
FIG. 9 is a schematic diagram illustrating an embodiment of the power unit of FIGS. 4-5.

FIG. 9 is a schematic diagram illustrating an embodiment of the power unit 26 of FIGS. 4-5. The power unit 26 here comprises a direct current (DC) to DC converter 23. For instance, if PoE is used, the voltage over the Ethernet cable is typically higher than what is suitable for powering the splitter device 1. The DC/DC converter 23 then ensures that the DC power for the splitter device is of a suitable voltage level.

Figure 10:
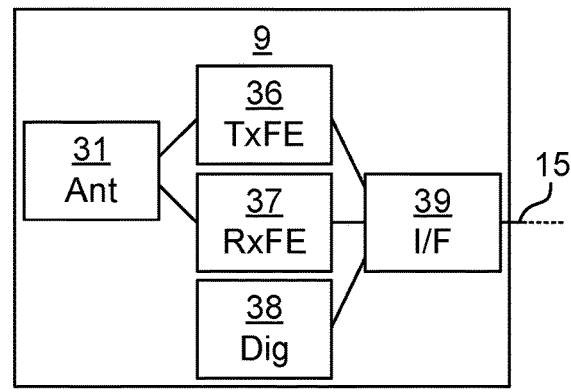
FIG. 10 is a schematic architecture diagram illustrating components of an embodiment of a remote radio head of FIGS. 1-3.

FIG. 10 is a schematic architecture diagram illustrating components of an embodiment of a remote radio head of FIGS. 1-3, here represented by a single remote radio head 9. The remote radio head comprises an interface circuitry 39, a transmission front-end 36, a reception front-end 37, a digital unit 38 and an antenna device 31. It is to be noted that the antenna device may comprise any number of antenna, e.g. one, two, four, six, eight, etc. When two or more antennas are used, MIMO (Multiple Input Multiple Output) can be employed. It should also be noted that a remote radio head may also support TDD/FDD operation and multi-band operation.

In line with what is explained above, the RX Front End 37 downconverts received signals in RF to IF for transfer over the cable to the IRU 5. Moreover, the TX Front End 36 upconverts transmission signals from IF, as received over the cable from the IRU 35 to RF for transmission to wireless devices.

The antenna device 31 may comprise one or more antenna elements for each antenna. Particularly, the antenna can comprise one or more antenna elements in a first polarisation and one or more antenna elements in a second polarisation to achieve an additional dimension of orthogonality. The two polarisations may be controlled separately. The antenna device 31 may also comprise appropriate filters to filter out unwanted signals.

The interface circuitry 39 inserts and extracts (multiplexes and demultiplexes) the transmission IF signal, the received IF signal and the control signal onto/from the cable. The interface circuitry 39 may use different frequency bands for uplink signals, downlink signals and control signals to thereby multiplex all of these on a single cable.

A digital unit 38 communicates with the processor 17 of the IRU. For example, the digital unit 38 may be used to receive commands from the processor 12 to alter frequencies used by the TX Front End 36 and RX Front End 37 for upconversion and/or downconversion. The digital unit 38 can be implemented using software instructions such as a computer program executed by a processor and/or using only hardware, such as application specific integrated circuits, field programmable gate arrays, discrete logical components, etc.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A splitter device comprising:
    a first trunk cable interface for connecting with a first aggregation node via a first trunk cable;
    a first radio head interface for connecting to a first remote radio head via a first distribution cable, the first radio head interface comprising a first gain control unit and a first uplink signal amplifier, wherein a gain of the first uplink signal amplifier is adjusted based on a signal from the gain control unit;
    a second radio head interface for connecting to a second remote radio head via a second distribution cable, the second radio head interface comprising a second gain control unit and a second uplink signal amplifier, wherein a gain of the second uplink signal amplifier is adjusted based on a signal from the second gain control unit;
    a signal combiner and splitter connected to the first radio head interface and the second radio head interface; and
    a radio signal refresh unit provided between the first trunk cable interface and the signal combiner and splitter.

2. The splitter device of claim 1, further comprising an automatic gain control unit configured to receive automatic gain control signals from the first remote radio head and the second remote radio head, and to control the gain of the first uplink signal amplifier and the second uplink signal amplifier based on the first and second automatic gain control signals, respectively.

3. The splitter device of claim 1, wherein each one of the first gain control unit and the second gain control unit comprises a respective cable loss measurement unit.

4. The splitter device of claim 1, wherein the radio signal refresh unit comprises at least one of a downlink signal amplifier and an uplink signal amplifier.

5. The splitter device of claim 1, wherein the radio signal refresh unit comprises a demodulator, a regenerator and a modulator which are all specific to a radio access technology.

6. The splitter device of claim 1, further comprising a synchronisation refresh unit configured to improve a downlink synchronisation signal for provision over the first distribution cable and the second distribution cable.

7. The splitter device of claim 6, wherein the synchronisation refresh unit comprises at least one of a synchronisation signal amplifier, a band-pass filter and a phase locked loop.

8. The splitter device of claim 1, further comprising an operation and maintenance relay for relaying operation and maintenance messages between a central operation and maintenance node and each one of the first remote radio head and the second remote radio head.

9. The splitter device of claim 1, further comprising an uplink power interface, a power unit and a downlink power interface, wherein the uplink power interface is configured to receive power from the first trunk cable for provision to the power unit and the radio head interface, the power unit is configured to power the splitter device and the downlink power interface is configured to provide power to remote radio heads via the respective distribution cables.

10. The splitter device of claim 9, wherein the power unit comprises a direct current, DC to DC converter.

11. The splitter device of claim 1, further comprising:
a second trunk cable interface for connecting with a second aggregation node via a second trunk cable; and
a controller configured to activate the second trunk interface when communication via the first trunk cable interface fails.

12. The splitter device of claim 1, wherein the splitter device is configured to be used both for downlink splitting and uplink combining.

13. The splitter device of claim 1, wherein the signal combiner and splitter is configured to digitally multiplex uplink control signals from the first remote radio head and the second remote radio head.

14. The splitter device of claim 1, wherein:
the signal combiner and splitter is configured to split downlink signals from the radio refresh unit for provision to the first radio head interface and the second radio head interface, and configured to combine uplink signals from the first radio head interface and the second radio head interface for provision to the radio refresh unit.

15. The splitter device of claim 1, wherein the radio signal refresh unit is configured to improve a quality of uplink and/or downlink signals.

16. A splitter device comprising:
a first trunk cable interface for connecting with a first aggregation node via a first trunk cable;
a first radio head interface for connecting to a first remote radio head via a first distribution cable, the first radio head interface comprising a first gain control unit and a first uplink signal amplifier, wherein a gain of the first uplink signal amplifier is adjusted based on a signal from the gain control unit;
a second radio head interface for connecting to a second remote radio head via a second distribution cable, the second radio head interface comprising a second gain control unit and a second uplink signal amplifier, wherein a gain of the second uplink signal amplifier is adjusted based on a signal from the second gain control unit;
a signal combiner and splitter connected to the first radio head interface and the second radio head interface; and
a radio signal refresh unit provided between the first trunk cable interface and the signal combiner and splitter;
wherein the radio signal refresh unit comprises at least one of a downlink signal amplifier and an uplink signal amplifier.

17. A splitter device comprising:
a first trunk cable interface for connecting with a first aggregation node via a first trunk cable;
a first radio head interface for connecting to a first remote radio head via a first distribution cable, the first radio head interface comprising a first gain control unit and a first uplink signal amplifier, wherein a gain of the first uplink signal amplifier is adjusted based on a signal from the gain control unit;
a second radio head interface for connecting to a second remote radio head via a second distribution cable, the second radio head interface comprising a second gain control unit and a second uplink signal amplifier, wherein a gain of the second uplink signal amplifier is adjusted based on a signal from the second gain control unit;
a signal combiner and splitter connected to the first radio head interface and the second radio head interface; and
a radio signal refresh unit provided between the first trunk cable interface and the signal combiner and splitter;
wherein the radio signal refresh unit comprises a demodulator, a regenerator and a modulator which are all specific to a radio access technology.

* * * * *